US012617888B2

(12) United States Patent
Choi et al.

(10) Patent No.: US 12,617,888 B2
(45) Date of Patent: May 5, 2026

(54) POLY(LACTIC ACID-b-3-HYDROXYPROPIONIC ACID) BLOCK COPOLYMER HAVING EXCELLENT TRANSPARENCY PROPERTY AND PRODUCTS CONTAINING THE SAME

(71) Applicant: LG CHEM, LTD., Seoul (KR)

(72) Inventors: Jung Yun Choi, Daejeon (KR); Yeonju Lee, Daejeon (KR); Solyi Park, Daejeon (KR); Chul Woong Kim, Daejeon (KR); Donggyun Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 634 days.

(21) Appl. No.: 18/020,519

(22) PCT Filed: Feb. 24, 2022

(86) PCT No.: PCT/KR2022/002696

§ 371 (c)(1),
(2) Date: Feb. 9, 2023

(87) PCT Pub. No.: WO2022/182154

PCT Pub. Date: Sep. 1, 2022

(65) Prior Publication Data

US 2023/0265232 A1 Aug. 24, 2023

(30) Foreign Application Priority Data

Feb. 24, 2021 (KR) ........................ 10-2021-0024929

(51) Int. Cl.

*C08F 293/00* (2006.01)
*C08G 63/06* (2006.01)
*C08G 63/08* (2006.01)

(52) U.S. Cl.

CPC ............ *C08F 293/00* (2013.01); *C08G 63/06* (2013.01); *C08G 63/08* (2013.01)

(58) Field of Classification Search

CPC ........ C08G 81/00; C08G 65/26; C08G 63/00; C08G 63/08; C08G 63/06; C08G 63/912

See application file for complete search history.

(56) References Cited

U.S. PATENT DOCUMENTS

| | | | |
|---|---|---|---|
| 5,824,751 A | 10/1998 | Hori et al. | |
| 11,773,223 B2 * | 10/2023 | Choi | C08G 63/08 524/539 |
| 2008/0221265 A1 | 9/2008 | Sodergard et al. | |
| 2011/0046339 A1 | 2/2011 | Park et al. | |
| 2020/0172680 A1 | 6/2020 | Choi et al. | |
| 2020/0402324 A1 | 12/2020 | Daimon et al. | |
| 2021/0238448 A1 | 8/2021 | Singh et al. | |
| 2021/0305816 A1 | 9/2021 | Kuranuki | |
| 2021/0309800 A1 | 10/2021 | Choi et al. | |
| 2021/0340314 A1 | 11/2021 | Choi et al. | |
| 2022/0267815 A1 | 8/2022 | Choi et al. | |
| 2022/0394781 A1 | 12/2022 | Lu et al. | |
| 2023/0265232 A1 | 8/2023 | Choi et al. | |

FOREIGN PATENT DOCUMENTS

| | | |
|---|---|---|
| CN | 1418901 | 5/2003 |
| EP | 3604395 | 2/2020 |
| JP | H09-040761 A | 2/1997 |
| JP | H10-024492 | 1/1998 |
| JP | 2003-181919 | 7/2003 |
| JP | 2007-138131 | 6/2007 |
| JP | 2013-057039 | 3/2013 |
| JP | 2021529230 A | 10/2021 |
| JP | 2022543067 A | 10/2022 |
| JP | 2023-512216 A | 3/2023 |
| JP | 2023-513233 A | 3/2023 |
| KR | 10-2005-0024295 | 3/2005 |
| KR | 10-2008-0046795 | 5/2008 |
| KR | 10-2010-0114742 | 10/2010 |
| KR | 10-2019-0078387 | 7/2019 |
| KR | 10-2019-0083816 | 7/2019 |
| KR | 10-2020-0115165 | 10/2020 |
| KR | 10-2020-0115166 | 10/2020 |
| KR | 10-2020-0126790 | 11/2020 |
| KR | 10-2021-0031319 A | 3/2021 |
| WO | 2009-022797 | 2/2009 |
| WO | 2020-003638 A1 | 1/2020 |
| WO | 2020197147 | 1/2020 |
| WO | 2020-049910 A1 | 3/2020 |

OTHER PUBLICATIONS

Ramier et al., "Microwave-Assisted Synthesis and Characterization of Biodegradable Block Copolyesters Based on Poly(3-hydroxyalkanoate)s and Poly(D,L-lactide)," Journal of Polymer Science Part A: Polymer Chemistry, 50:1445-1455 (2012).

* cited by examiner

*Primary Examiner* — Gregory Listvoyb
(74) *Attorney, Agent, or Firm* — Bryan Cave Leighton Paisner LLP

(57) ABSTRACT

Provided is a poly(lactic acid-b-3-hydroxypropionic acid) block copolymer in which transparency is improved by introducing a 3-hydroxypropionic acid-derived monomer into a polylactic acid, and thus its application field can be expanded.

9 Claims, No Drawings

POLY(LACTIC ACID-b-3-HYDROXYPROPIONIC ACID) BLOCK COPOLYMER HAVING EXCELLENT TRANSPARENCY PROPERTY AND PRODUCTS CONTAINING THE SAME

CROSS-REFERENCE TO RELATED APPLICATION

This application is a National Stage Application of International Application No. PCT/KR2022/002696 filed on Feb. 24, 2022, which claims priority to and the benefits of Korean Patent Application No. 10-2021-0024929, filed on Feb. 24, 2021, the disclosure of which is hereby incorporated by reference herein in its entirety.

TECHNICAL FIELD

The present invention relates to a poly(lactic acid-b-3-hydroxypropionic acid) block copolymer having excellent transparency property and articles including the same.

BACKGROUND

Polylactic acid (PLA) is a plant-derived resin obtained from plants such as corn, etc., and receives much attention as an excellent eco-friendly material because it has biodegradable properties. Unlike existing petroleum-based resins generally used, such as polystyrene resins, polyvinyl chloride resins, polyethylene, etc., polylactic acid has effects of preventing the depletion of petroleum resources and suppressing carbon dioxide emission, etc., and therefore, it can reduce environmental pollution, which is a disadvantage of petroleum-based plastic products. As the environmental pollution problems caused by waste plastics, etc. have emerged as social problems, efforts are being made to expand the range of application of polylactic acid to products where general plastics (petroleum-based resins) have been used, such as food packaging materials and containers, electronic product cases, etc.

However, polylactic acid has poor impact resistance and heat resistance, as compared to existing petroleum-based resins, and thus it has a limited range of application. In addition, its tensile strength is weak and transparency is required depending on the application field. Since it is difficult to control the physical properties of polylactic acid, polylactic acid has a limitation as a general-purpose resin.

In order to improve the above disadvantages, studies have been conducted on a copolymer by including other repeating units in polylactic acid, and in particular, 3-hydroxypropionic acid received attention as a comonomer. However, polylactic acid expresses different physical properties depending on the degree of introduction of 3-hydroxypropionic acid. When the degree of introduction thereof is not controlled, the intrinsic physical properties of the polylactic acid are deteriorated.

Accordingly, the present invention is intended to provide a block copolymer having excellent physical properties such as transparency, etc., while maintaining the intrinsic physical properties of polylactic acid by controlling the degree of introduction of a 3-hydroxypropionic acid-derived monomer.

BRIEF DESCRIPTION

Technical Problem

Provided is a copolymer having excellent physical properties such as transparency, etc., while maintaining the intrinsic properties of polylactic acid, and an article including the same.

Technical Solution

To achieve the above object, provided is a poly(lactic acid-b-3-hydroxypropionic acid) block copolymer of the following Chemical Formula 1, wherein the poly(lactic acid-b-3-hydroxypropionic acid) block copolymer has UV transparency of 80% or more:

[Chemical Formula 1]

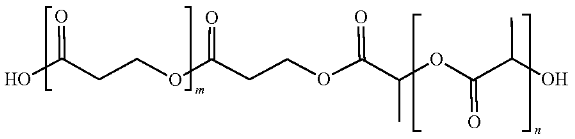

wherein in Chemical Formula 1:

m is an integer of 100 to 1000; and n is an integer of 500 to 4000.

DETAILED DESCRIPTION

As used herein, the term 'poly(lactic acid-b-3-hydroxypropionic acid) block copolymer', which is a block copolymer obtained by polymerizing a lactide-derived monomer and a 3-hydroxypropionic acid-derived monomer, as shown in Chemical Formula 1, refers to a block copolymer, in which various physical properties of polylactic acid are controlled by introducing the 3-hydroxypropionic acid-derived monomer.

When the 3-hydroxypropionic acid-derived monomer is introduced as a comonomer of polylactic acid, various physical properties of polylactic acid can be improved, but the expressed physical properties can differ depending on the degree of introduction. Accordingly, in the present invention, the degree of introduction of the 3-hydroxypropionic acid-derived monomer can be controlled to control physical properties such as transparency, etc., while maintaining the intrinsic physical properties of polylactic acid.

Preferably, m is 120 to 350. m means the number of repeats of the 3-hydroxypropionic acid-derived monomer. When the 3-hydroxypropionic acid-derived monomer is introduced in the above range, it is possible to control physical properties such as transparency, etc., while maintaining the intrinsic physical properties of polylactic acid. More preferably, m is 130 or more, 140 or more, 150 or more, 160 or more, 170 or more, 180 or more, 190 or more, or 200 or more; and 340 or less, 330 or less, 320 or less, 310 or less, or 300 or less.

Preferably, n is 1000 to 2500. n means the number of repeats of the lactide-derived monomer. More preferably, n is 1100 or more, 1200 or more, 130 or more, 1400 or more, or 1500 or more; and 2400 or less, 2300 or less, 2200 or less, 2100 or less, or 2000 or less.

Further, in the present invention, the relative ratio of the monomers is important, and preferably, m/n is 0.05 to 0.20. In the above range of m/n, it is possible to control physical properties such as transparency, etc., while maintaining the intrinsic physical properties of polylactic acid. More preferably, m/n is 0.06 or more, 0.07 or more, or 0.08 or more; and 0.19 or less, 0.18 or less, 0.17 or less, 0.16 or less, or 0.15 or less.

Preferably, UV transparency of the poly(lactic acid-b-3-hydroxypropionic acid) block copolymer according to the present invention is 81% or more, 82% or more, 83% or more, 84% or more, 85% or more, 86% or more, 87% or more, 88% or more, 89% or more, or 90%. Further, the upper limit of the UV transparency is theoretically 100%, for example, 99.5% or less, 99.0% or less, 98.5% or less, or 98.0% or less. A method of measuring the UV transparency will be specified in the Examples to be described later.

Preferably, elongation of the poly(lactic acid-b-3-hydroxypropionic acid) block copolymer according to the present invention is 1% to 250%. Preferably, the elongation of the poly(lactic acid-b-3-hydroxypropionic acid) block copolymer according to the present invention is 40% or more, 50% or more, 60% or more, 70% or more, 80% or more, 90% or more, or 100% or more. Further, the elongation of the poly(lactic acid-b-3-hydroxypropionic acid) block copolymer according to the present invention is preferably 240% or less, 230% or less, 220% or less, 210% or less, 200% or less, 150% or less, or 120% or less. A method of measuring the elongation will be specified in the Examples to be described later.

A tensile strength of the poly(lactic acid-b-3-hydroxypropionic acid) block copolymer according to the present invention is 30 MPa to 60 MPa. A method of measuring the tensile strength will be specified in Examples to be described later. Preferably, the tensile strength of the poly(lactic acid-b-3-hydroxypropionic acid) block copolymer according to the present invention is 31 MPa or more, 32 MPa or more, 33 MPa or more, 34 MPa or more, or 35 MPa or more. Meanwhile, the tensile strength is more excellent as the value is higher. However, when the value is too high, the application field of the copolymer can be restricted. In this point of view, the tensile strength of the poly(lactic acid-b-3-hydroxypropionic acid) block copolymer according to the present invention is preferably 60 MPa or less. More preferably, the tensile strength of the poly(lactic acid-b-3-hydroxypropionic acid) block copolymer according to the present invention is 55 MPa or less, 50 MPa or less, 45 MPa or less, or 40 MPa or less.

Further, a tensile modulus of the poly(lactic acid-b-3-hydroxypropionic acid) block copolymer according to the present invention is preferably 1.5 GPa to 2.5 GPa. A method of measuring the tensile modulus will be specified in the Examples to be described later.

Further, a weight average molecular weight of the poly(lactic acid-b-3-hydroxypropionic acid) block copolymer is preferably 50,000 to 350,000. More preferably, the weight average molecular weight of the poly(lactic acid-b-3-hydroxypropionic acid) block copolymer is 60,000 or more, 70,000 or more, 80,000 or more, 90,000 or more, or 100,000 or more; and 300,000 or less, 250,000 or less, 200,000 or less, or 150,000 or less.

Also provided is a method of preparing the above-described poly(lactic acid-b-3-hydroxypropionic acid) block copolymer, the method including the step of polymerizing a 3-hydroxypropionic acid polymer, lactide, and a catalyst.

The 3-hydroxypropionic acid polymer refers to a homopolymer of 3-hydroxypropionic acid, and those prepared by controlling the polymerization degree in consideration of the above-described ranges of m and n are used.

Meanwhile, the preparation method is carried out in the presence of a lactide ring-opening catalyst, since a lactide ring-opening polymerization reaction is involved. For example, the catalyst can be a catalyst of Chemical Formula 2:

$$MA^1_pA^2_{2-p} \quad \text{[Chemical Formula 2]}$$

wherein in Chemical Formula 2:

M is Al, Mg, Zn, Ca, Sn, Fe, Y, Sm, Lu, Ti, or Zr;

p is an integer of 0 to 2; and $A^1$ and $A^2$ are each independently an alkoxy or carboxyl group.

More specifically, the catalyst of Chemical Formula 2 can be tin(II) 2-ethylhexanoate ($Sn(Oct)_2$).

Preferably, the amount of the catalyst used can be 0.001 mol % to 10 mol %, 0.01 mol % to 5 mol %, or 0.03 mol % to 1 mol %, when the total number of moles of lactide is regarded as 100 mol %.

Preferably, the preparation method is carried out at 150° C. to 200° C. Preferably, the preparation method is carried out for 5 minutes to 10 hours, and more preferably, for 10 minutes to 1 hour. Preferably, the preparation method is carried out at 0.5 atm to 1.5 atm.

Also provided is an article including the above-described poly(lactic acid-b-3-hydroxypropionic acid) block copolymer.

Effect of the Invention

As described above, a poly(lactic acid-b-3-hydroxypropionic acid) block copolymer according to the present invention is characterized in that transparency of polylactic acid is improved by introducing a 3-hydroxypropionic acid-derived monomer into polylactic acid, and thus its application field can be expanded.

EXAMPLES

Hereinafter, embodiments of the present invention will be described in more detail in the following Examples. However, the following Examples are only for illustrating the embodiments of the present invention, and the content of the present invention is not limited by the following Examples.

Preparation Example: Preparation of Poly(3-Hydroxypropionate)-Oligomer

For the biosynthesis of high-molecular-weight poly(3-hydroxypropionate) according to the present invention, fermentation was first performed under the following conditions to prepare a fermentation broth containing 3-hydroxypropionate as a fermentation substrate. Specifically, *E. coli* W3110 having GDH and ALDH enzyme genes was used as a strain for fermentation. M9 was used as a medium, and fermentation was performed using 70 g/L of glycerol as a substrate to produce 3-hydroxypropionate.

Thereafter, the prepared 3-hydroxypropionate was used as a substrate to produce poly(3-hydroxypropionic acid) (hereinafter, referred to as 'P(3HP)') by fermentation. Specifically, a 5 L fermenter (internal volume: 3 L) was used for the fermentation. As a microorganism for the fermentation, a recombinant *E. coli* was used, which was prepared by transforming a recombinant vector into XL1-Blue *E. coli*, the recombinant vector prepared by cloning an RecC gene which is a polyhydroxyalkanoate synthase (PHA synthase) derived from *Ralstonia eutropha*, and a propionyl-CoA transferase variant 540 (CPPCT_540) gene derived from *Clostridium propionicum*, into the pBLuescript II KS+ vector.

The CPPCT_540 gene is an improved gene, in which its nucleotide sequence was substituted to cause a change of valine to alanine (V193A) at position 193 and three silent mutations (T669C, A1125G, and T1158C) occurred by only DNA substitution without any other amino acid change (WO 09/022797).

As a medium, a fermentation broth (2.0 g/L) prepared by adding glucose (20 g/L) and 3-hydroxypropionate prepared above as a substrate to a modified Riesenberg (MR) medium was introduced. This fermentation broth was fermented by aeration under conditions of 300 rpm and 1 vvm to finally produce a high-molecular-weight poly(3-hydroxypropionate) (Mn: 136,645; Mw: 354,615; PDI: 2.60; measured using Agilent 1200 series, and calibrated with PC standards).

The prepared poly(3-hydroxypropionate) was added to distilled water and hydrolyzed at 100° C. for 12 hours, 18 hours, 24 hours, and 72 hours, respectively to obtain poly (3-hydroxypropionate) oligomers having a weight average molecular weight of 15,000 g/mol, 30,000 g/mol, 60,000 g/mol, and 80,000 g/mol, respectively (measured using Agilent 1200 series, and calibrated with PC standards).

Example 1: Preparation of Poly(Lactic Acid-b-3-Hydroxypropionic Acid) Block Copolymer In a reactor, lactide (25 g), the poly(3-hydroxypropionate) oligomer (3 g) having a weight average molecular weight of 15,000 g/mol prepared in Preparation Example above, tin(II) ethylhexanoate (0.014 g) as a catalyst, and toluene (100 μL) were added, followed by drying for about 30 minutes to about 1 hour. Then, the reactor was placed in an oil bath pre-heated to 180° C., and polymerization was allowed to proceed for 1.5 hours. After removing a product from the reactor, the product was subjected to devolatilization for about 3 hours at 140° C. under a reduced pressure of 1 torr to 5 torr to remove the monomer, thereby preparing a poly(lactic acid-b-3-hydroxypropionic acid) block copolymer.

Examples 2 to 5 and Comparative Example: Preparation of Poly(Lactic Acid-b-3-Hydroxypropionic Acid) Block Copolymer Each poly(lactic acid-b-3-hydroxypropionic acid) block copolymer was prepared in the same manner as in Example 1, except that the starting material was changed as shown in the following Table 1 below.

TABLE 1

| | | P(3HP) | | |
|---|---|---|---|---|
| | Lactide (g) | Weight average molecular weight (g/mol) | Amount of use (g) | Tin(II) ethylhexanoate (g) |
| Example 1 | 25 | 15,000 | 3 | 0.014 |
| Example 2 | 25 | 30,000 | 5 | 0.014 |
| Example 3 | 25 | 30,000 | 3 | 0.014 |
| Example 4 | 25 | 30,000 | 5 | 0.014 |
| Example 5 | 25 | 15,000 | 5 | 0.014 |

Experimental Example

The properties of the copolymers prepared in Examples were evaluated as follows.

Weight average molecular weight: measured by GPC using Agilent 1200 series and PC standards.

Elongation, Tensile strength, and Tensile modulus: performed according to ASTM D638. ASTM D536 V Type specimens were manufactured using a hot-press device (Limotem QM900S), and then measurement was performed using a universal testing machine (UTM) under a load of 10 mm/s, 60 kg/f.

Content (wt %) of 3-hydroxypropionic acid in block copolymer: measured by NMR analysis of the block copolymer.

UV transparency: the copolymer was prepared into an 80 μm thick sheet using a hot-press (Limotem QM900S), which was then attached to a UV-visible spectrometer (Agilent 8453) to measure transparency. A transparency value was examined in the region of 480 nm.

The measurement results are shown in the following Table.

TABLE 2

| | m | n | m + n | m/n | Weight average molecular weight (g/mol) | Tensile strength (MPa) | Elongation (%) | Tensile modulus (GPa) | UV transparency (%) |
|---|---|---|---|---|---|---|---|---|---|
| Example 1 | 140 | 1,800 | 1,940 | 0.08 | 127,600 | 47.3 | 2 | 2.45 | 92.8 |
| Example 2 | 290 | 1,900 | 2,190 | 0.15 | 177,400 | 31.2 | 25 | 1.58 | 91.0 |
| Example 3 | 280 | 3,700 | 3,980 | 0.08 | 309,100 | 50.7 | 4 | 2.36 | 90.7 |
| Example 4 | 280 | 1,900 | 2,180 | 0.15 | 164,300 | 37.0 | 15 | 1.8 | 81.0 |
| Example 5 | 140 | 1,100 | 1,380 | 0.12 | 119,000 | 37.0 | 120 | 1.73 | 92.3 |
| Comparative Example | 630 | 1,100 | 1,730 | 0.57 | 89,500 | 36.3 | 110 | 1.23 | 60.08 |

The invention claimed is:

1. A poly(lactic acid-b-3-hydroxypropionic acid) block copolymer of the following Chemical Formula 1, wherein UV transparency of the poly(lactic acid-b-3-hydroxypropionic acid) block copolymer is 80% or more:

[Chemical Formula 1]

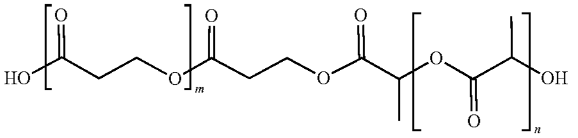

wherein in Chemical Formula 1:

m is an integer of 100 to 1000;

n is an integer of 500 to 4000; and m/n is 0.05 to 0.20.

2. The poly(lactic acid-b-3-hydroxypropionic acid) block copolymer of claim 1, wherein m is 120 to 350.

3. The poly(lactic acid-b-3-hydroxypropionic acid) block copolymer of claim 1, wherein n is 1000 to 2500.

4. The poly(lactic acid-b-3-hydroxypropionic acid) block copolymer of claim 1, wherein elongation of the poly(lactic acid-b-3-hydroxypropionic acid) block copolymer is 1% to 250%.

5. The poly(lactic acid-b-3-hydroxypropionic acid) block copolymer of claim 1, wherein elongation of the poly(lactic acid-b-3-hydroxypropionic acid) block copolymer is 5% to 35%.

6. The poly(lactic acid-b-3-hydroxypropionic acid) block copolymer of claim 1, wherein tensile strength of the poly (lactic acid-b-3-hydroxypropionic acid) block copolymer is 30 MPa to 60 MPa.

7. The poly(lactic acid-b-3-hydroxypropionic acid) block copolymer of claim 1, wherein tensile modulus of the poly(lactic acid-b-3-hydroxypropionic acid) block copolymer is 1.5 GPa to 2.5 GPa.

8. The poly(lactic acid-b-3-hydroxypropionic acid) block copolymer of claim 1, wherein a weight average molecular weight of the poly(lactic acid-b-3-hydroxypropionic acid) block copolymer is 50,000 to 350,000.

9. An article, comprising the poly(lactic acid-b-3-hydroxypropionic acid) block copolymer of claim 1.

* * * * *